United States Patent
Harter et al.

(10) Patent No.: US 6,744,166 B2
(45) Date of Patent: Jun. 1, 2004

(54) END CAP ASSEMBLY FOR A SWITCHED RELUCTANCE ELECTRIC MACHINE

(75) Inventors: Bernard G. Harter, Lynnville, IN (US); James A. Wafer, Belleville, IL (US); Donald J. Williams, Pierron, IL (US)

(73) Assignee: Emerson Electric Co., St. Louis, MO (US)

( * ) Notice: Subject to any disclaimer, the term of this patent is extended or adjusted under 35 U.S.C. 154(b) by 44 days.

(21) Appl. No.: 09/754,537

(22) Filed: Jan. 4, 2001

(65) Prior Publication Data

US 2002/0084716 A1 Jul. 4, 2002

(51) Int. Cl.[7] .............................. H02K 3/48; H02K 1/06
(52) U.S. Cl. ...................... 310/214; 310/215; 310/217; 310/71; 310/254
(58) Field of Search ................................. 310/214–215, 310/217, 254, 258, 71, 43, 194, 42, 218, 89, 216

(56) References Cited

U.S. PATENT DOCUMENTS

| 1,756,672 A | * | 4/1930 | Barr ............................ 310/259 |
| 2,688,103 A | | 8/1954 | Sheldon ...................... 310/254 |

(List continued on next page.)

FOREIGN PATENT DOCUMENTS

| DE | 2937838 A | 4/1981 |
| EP | 0350429 | 1/1990 |
| EP | 0823711 A1 | 2/1998 |
| EP | 0778660 A3 | 9/1998 |
| EP | 0868010 A1 | 9/1998 |
| EP | 0871282 A1 | 10/1998 |
| EP | 0967135 A2 | 12/1999 |
| FR | 2719324 | 11/1995 |

(List continued on next page.)

OTHER PUBLICATIONS

Gallegos–Lopez/Kjaer/Miller, "A New Sensorless Method for Switched reluctance Motor Drives", 1997, Department of Electronics and Electrical Engineering, p. 564–570.

Mvungi/Stephenson, Accurate Sensorless Rotor Position In An SR Motor, 1991, p. 76–79.

Roy McCann, "Variable Effort Steering for Vehicle Stability Enhancement Using an Electric Power Steering System", SAE Technical Paper Series 2000–01–0817, Mar. 6–9, 2000, p. 1–5.

Toboldt/Johnson/Olive, "Goodheart–Wilcox Automotive Encyclopedia", 1989, p. 577–584.

G. Gallegos–Lopez, P.C. Kjaer, T.J.E. Miller, "A New Rotor Position Estimation Method For Switched Reluctance Motors Using PWM Voltage Control", in Proc EPE'97, 7th European Conf. on Power Electronics and Applications 8–10 Sep. 1997 Trondheim Norway vol. 3 pp. 580–585.

(List continued on next page.)

*Primary Examiner*—Burton S. Mullins
*Assistant Examiner*—J. Aguirrechea
(74) *Attorney, Agent, or Firm*—Harness, Dickey & Pierce P.L.C.

(57) ABSTRACT

A winding end cap assembly for an electric machine with a stator and stator poles includes first and second end caps that are connected to opposite axial end surfaces of one of the stator poles. First and second inner winding retainer sections extend axially to connect an inner end of the first end cap to an inner end of the second end cap. The first and second end caps include an outer section, an inner section and a hub section that connects the outer section to the inner section. The first and second end caps and the first and second inner winding retainer sections define a continuous annular channel that receives and retains winding wire. First and second outer retainer sections connect the first and second end caps adjacent to the outer sections or the hub sections of the first and second end caps.

28 Claims, 5 Drawing Sheets

U.S. PATENT DOCUMENTS

| | | | |
|---|---|---|---|
| 2,894,157 A | * 7/1959 | Morril | 310/179 |
| 3,604,222 A | 9/1971 | Sandkrug et al. | |
| 3,914,859 A | * 10/1975 | Pierson | 310/218 |
| 3,979,821 A | 9/1976 | Noodleman | 29/598 |
| 3,987,324 A | 10/1976 | Linkous | 310/197 |
| 4,130,770 A | 12/1978 | Wrobel | |
| 4,149,309 A | 4/1979 | Mitsui | 29/596 |
| 4,340,829 A | * 7/1982 | McCoy | 310/51 |
| 4,350,914 A | * 9/1982 | Searle | 310/194 |
| 4,418,307 A | 11/1983 | Hoffmann et al. | 318/721 |
| 4,584,495 A | 4/1986 | Kordik | 310/49 R |
| 4,635,349 A | 1/1987 | Rabe | 29/596 |
| 4,698,542 A | 10/1987 | Muller | |
| 4,772,839 A | 9/1988 | MacMinn et al. | |
| 4,812,695 A | 3/1989 | Parshall | 310/258 |
| 4,819,460 A | 4/1989 | Obradovic | 68/23.7 |
| 4,845,837 A | 7/1989 | Lloyd | 29/548 |
| 4,883,982 A | 11/1989 | Forbes et al. | |
| 4,896,089 A | 1/1990 | Kliman et al. | |
| 4,922,165 A | 5/1990 | Crawford et al. | 310/215 |
| 4,950,932 A | 8/1990 | Harms et al. | |
| 4,953,284 A | 9/1990 | Hammer et al. | 29/596 |
| 4,959,596 A | 9/1990 | MacMinn et al. | |
| 4,998,052 A | 3/1991 | Erdman et al. | 318/701 |
| 5,034,642 A | 7/1991 | Hoemann et al. | 310/156 |
| 5,076,076 A | 12/1991 | Payne | 68/12.14 |
| 5,161,393 A | 11/1992 | Payne et al. | 68/12.04 |
| 5,173,650 A | 12/1992 | Hedlund | |
| 5,194,775 A | 3/1993 | Cooper | 310/260 |
| 5,212,419 A | 5/1993 | Fisher et al. | 310/254 |
| 5,252,902 A | 10/1993 | Uehara et al. | 318/599 |
| 5,256,926 A | 10/1993 | Hagenlocher et al. | 310/259 |
| 5,257,828 A | 11/1993 | Miller et al. | |
| 5,301,523 A | 4/1994 | Payne et al. | 68/12.16 |
| 5,325,677 A | 7/1994 | Payne et al. | 68/12.04 |
| 5,327,053 A | 7/1994 | Mann et al. | |
| 5,410,235 A | 4/1995 | Ehsani | 318/701 |
| 5,457,375 A | 10/1995 | Marcinkiewicz et al. | 318/802 |
| 5,467,025 A | 11/1995 | Ray | |
| 5,491,859 A | 2/1996 | Richardson | 8/159 |
| 5,563,463 A | 10/1996 | Stark | 310/156 |
| 5,578,880 A | 11/1996 | Lyons et al. | |
| 5,583,387 A | 12/1996 | Takeuchi et al. | |
| 5,589,751 A | 12/1996 | Lim | 318/701 |
| 5,672,925 A | 9/1997 | Lipo et al. | 310/154.11 |
| 5,691,591 A | 11/1997 | McCann | 310/198 |
| 5,701,064 A | 12/1997 | Horst et al. | 318/701 |
| 5,720,065 A | 2/1998 | Myers | 8/159 |
| 5,729,072 A | 3/1998 | Hirano et al. | 310/258 |
| 5,740,880 A | 4/1998 | Miller | |
| 5,743,721 A | 4/1998 | Graham et al. | |
| 5,763,978 A | 6/1998 | Uchida et al. | 310/215 |
| 5,777,416 A | 7/1998 | Kolomeitsev | 310/168 |
| 5,783,916 A | 7/1998 | Blackburn | 318/254 |
| 5,786,651 A | 7/1998 | Suzuki | |
| 5,793,179 A | 8/1998 | Watkins | 318/701 |
| 5,806,169 A | * 9/1998 | Trago et al. | 310/43 |
| 5,811,905 A | 9/1998 | Tang | |
| 5,821,661 A | 10/1998 | Wissmach et al. | |
| 5,859,518 A | 1/1999 | Vitunic | 318/701 |
| 5,877,568 A | 3/1999 | Maes et al. | |
| 5,883,485 A | 3/1999 | Mehlhorn | 318/701 |
| 5,923,141 A | 7/1999 | McHugh | 318/701 |
| 5,929,590 A | 7/1999 | Tang | 318/701 |
| 5,949,211 A | 9/1999 | McCann | 318/701 |
| 5,955,861 A | 9/1999 | Jeong et al. | 318/701 |
| 5,979,195 A | 11/1999 | Bestell et al. | 68/23.2 |
| 5,982,117 A | 11/1999 | Tayor et al. | 318/254 |
| 5,990,592 A | 11/1999 | Miura et al. | 310/156 |
| 5,994,804 A | 11/1999 | Grennan et al. | |
| 5,996,379 A | 12/1999 | Skrippek | 68/140 |
| 6,011,368 A | 1/2000 | Kalpathi et al. | 318/434 |
| 6,020,661 A | 2/2000 | Trago et al. | 310/43 |
| 6,040,647 A | 3/2000 | Brown et al. | 310/89 |
| 6,041,625 A | 3/2000 | Nagai et al. | |
| 6,049,153 A | 4/2000 | Nishiyama et al. | 310/156 |
| 6,066,905 A | * 5/2000 | Wright et al. | 310/194 |
| 6,081,083 A | 6/2000 | Nashiki | 318/254 |
| 6,087,755 A | * 7/2000 | Suzuki et al. | 310/254 |
| 6,092,619 A | 7/2000 | Nishikawa et al. | 180/446 |
| 6,102,151 A | 8/2000 | Shimizu et al. | 180/446 |
| 6,104,113 A | 8/2000 | Beifus | |
| 6,107,772 A | 8/2000 | Liu et al. | 318/701 |
| 6,122,579 A | 9/2000 | Collier-Hallman et al. | 701/41 |
| 6,127,753 A | * 10/2000 | Yamazaki et al. | 310/216 |
| 6,144,131 A | 11/2000 | Hollenbeck et al. | 310/156 |
| 6,166,468 A | * 12/2000 | Suzuki et al. | 310/254 |
| 6,177,751 B1 | * 1/2001 | Suzuki et al. | 310/218 |
| 6,188,196 B1 | 2/2001 | Koide et al. | 318/700 |
| 6,194,805 B1 | 2/2001 | Heese et al. | |
| 6,194,806 B1 | * 2/2001 | Suzuki et al. | 310/216 |
| 6,204,579 B1 | 3/2001 | Arpino | 310/43 |
| 6,211,587 B1 | * 4/2001 | Enomoto et al. | 310/89 |
| 6,218,753 B1 | 4/2001 | Asano et al. | 310/156 |
| 6,219,900 B1 | * 4/2001 | Suzuki | 310/218 |
| 6,226,856 B1 | * 5/2001 | Kazama et al. | 310/216 |
| 6,239,530 B1 | 5/2001 | Garcia | 310/216 |
| 6,252,325 B1 | 6/2001 | Nashiki | 310/168 |
| 6,266,591 B1 | 6/2001 | Wilson-Jones et al. | |
| 6,300,700 B1 | * 10/2001 | Nishiyama et al. | 310/179 |
| 6,329,782 B1 | 12/2001 | Chen et al. | |
| 6,359,412 B1 | 3/2002 | Heglund | |
| 6,369,481 B1 | 4/2002 | Bahn | |
| 6,369,687 B1 | 4/2002 | Akita et al. | |
| 6,373,211 B1 | 4/2002 | Henry et al. | |
| 6,384,564 B1 | 5/2002 | Pollock | 318/701 |
| 6,389,678 B1 | 5/2002 | Ackermann et al. | 29/596 |
| 6,411,006 B2 | * 6/2002 | Suzuki et al. | 310/254 |
| 6,487,769 B2 | * 12/2002 | Ketterer et al. | 29/596 |
| 2001/0010452 A1 | 8/2001 | Moriarty | |
| 2001/0030517 A1 | 10/2001 | Batzel | |
| 2002/0089251 A1 | 7/2002 | Tajima et al. | |

FOREIGN PATENT DOCUMENTS

| | | | |
|---|---|---|---|
| GB | 1200279 | 7/1970 | |
| JP | 61030938 | 2/1986 | |
| JP | 404049826 A | 2/1992 | |
| JP | 05-038086 | 2/1993 | |
| JP | 07245226 A | * 9/1995 | H01F/41/02 |
| JP | 08-033292 | 2/1996 | |
| JP | 09084282 | 3/1997 | |
| JP | 09-233742 | 9/1997 | |
| JP | 09-322439 | 12/1997 | |
| JP | 10-174319 | 6/1998 | |
| JP | 10-210721 | 8/1998 | |
| JP | 10-271718 | 10/1998 | |
| JP | 11-018331 | 1/1999 | |
| JP | 11-089129 | 3/1999 | |
| JP | 11-191987 | 7/1999 | |
| JP | 11-275830 | 10/1999 | |
| JP | 11-289701 | 10/1999 | |
| JP | 11-289726 | 10/1999 | |
| JP | 11-289727 | 10/1999 | |
| JP | 11-289728 | 10/1999 | |
| JP | 11-332138 | 11/1999 | |
| JP | 11-341717 | 12/1999 | |
| JP | 2000-014057 | 1/2000 | |
| JP | 2000-37050 | 2/2000 | |
| JP | 2000-139052 | 5/2000 | |
| JP | 2000-224790 | 8/2000 | |
| JP | 2000-312451 | 11/2000 | |

| | | |
|---|---|---|
| JP | 2000-333388 | 11/2000 |
| JP | 2001-008395 | 1/2001 |
| RU | 1354338 A1 | 11/1987 |
| WO | WO 00/37731 | 6/2000 |
| WO | WO 00/79670 A1 | 12/2000 |
| WO | WO 01/95459 A1 | 12/2001 |

OTHER PUBLICATIONS

Stephenson/Blake, "The Characteristics, Design and Applications of Switched Reluctance Motors and Drives", presented at the PCIM '93 Conference and Exhibition at Nuremburg, Germany, Jun. 21–24, 1993.

T.J.E. Miller, "Switched Reluctance Motors and Their Control", Magna Physics Publishing and Claredon Press Oxford 1993.

WF Ray and IH Al–Bahadly, "Sensorless Methods for Determining the Rotor Position of Switched Reluctance Motors", published in the Proceedings of the European Power Electronics Conference, Brighton UK 13–16 Sep. 1993 vol. 6, pp. 7–13.

* cited by examiner

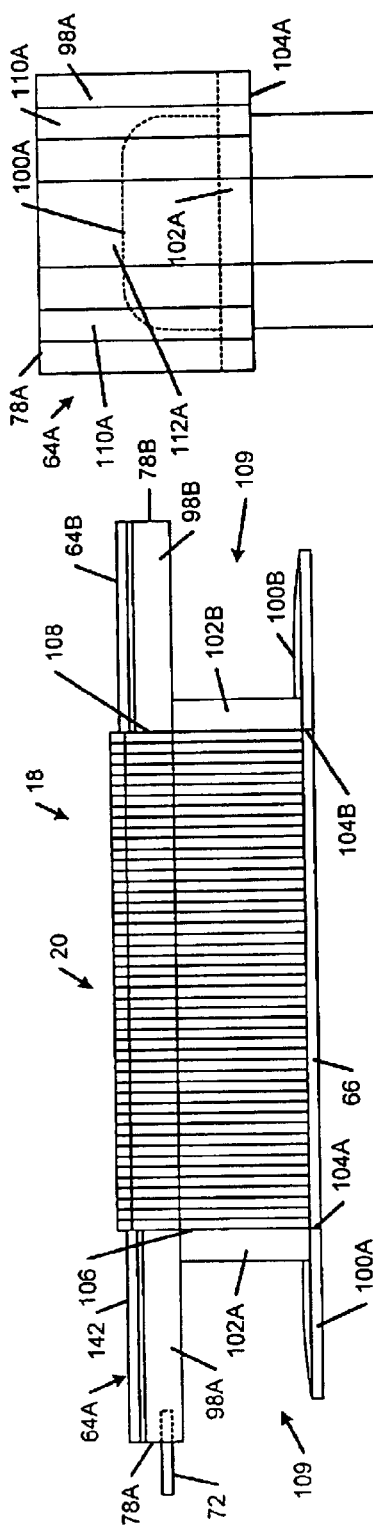
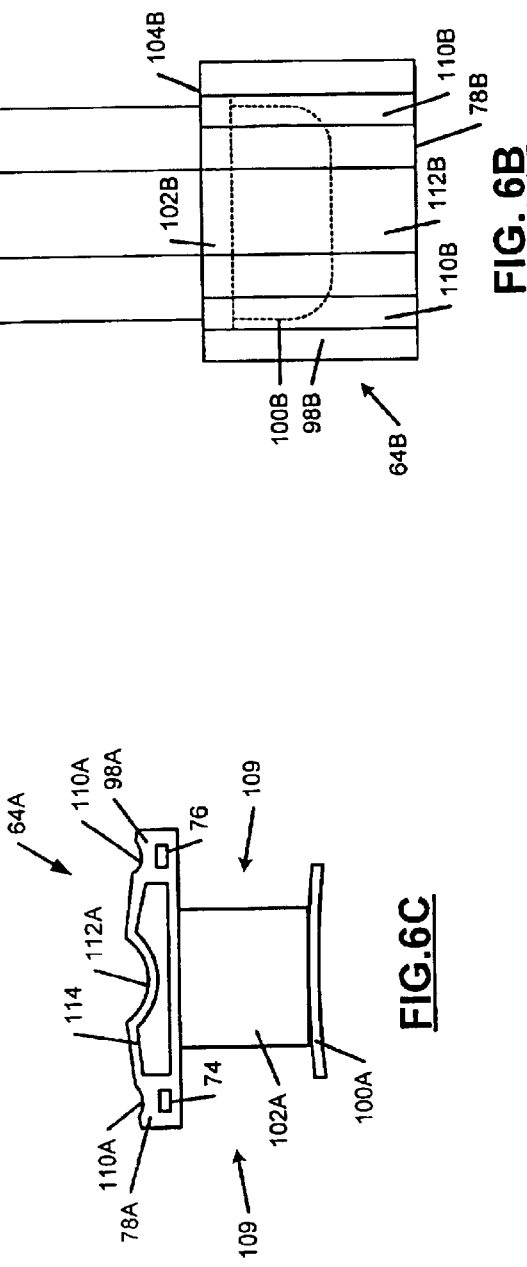
FIG. 6A
FIG. 6B
FIG. 6C

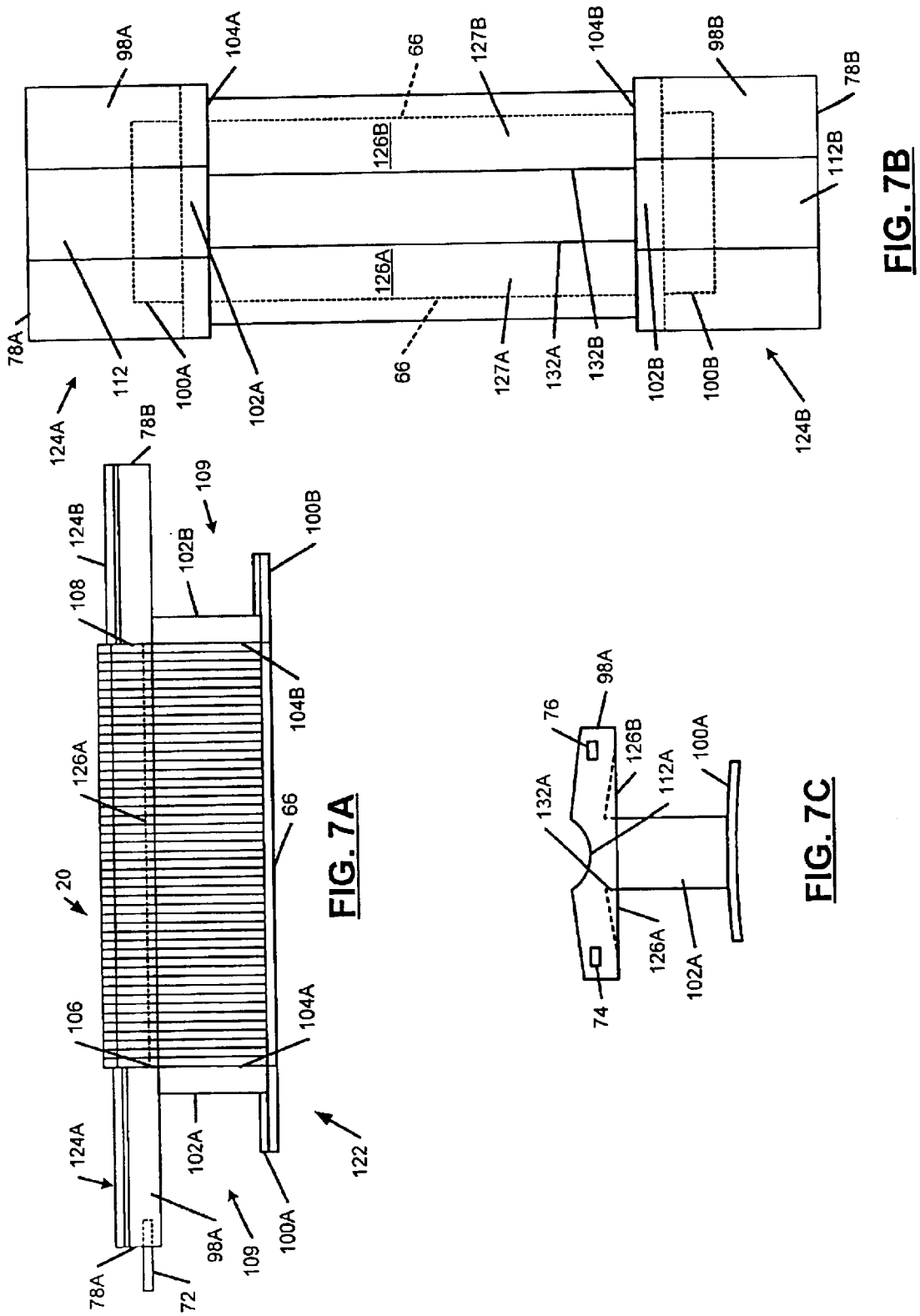

END CAP ASSEMBLY FOR A SWITCHED RELUCTANCE ELECTRIC MACHINE

RELATED APPLICATIONS

This application relates to U.S. patent application Ser. No. 09/817,559, filed Mar. 26, 2001; Ser. No. 09/803,876, filed Mar. 12, 2001; Ser. No. 09/761,125, filed Jan. 16, 2001; Ser. No. 09/824,980, filed Apr. 3, 2001; Ser. No. 09/817,560, filed Mar. 26, 2001; Ser. No. 09/817,687, filed Mar. 26, 2001; and U.S. Pat. No. 6,487,769, issued Dec. 3, 2002.

FIELD OF THE INVENTION

This invention relates to electric machines and more particularly to a winding end cap assembly for an electric machine.

BACKGROUND OF THE INVENTION

Reluctance electric machines, such as motors and generators, typically include a stator that is mounted inside a machine housing and a rotor that is supported for rotation relative to the stator. Reluctance electric machines produce torque as a result of the rotor tending to rotate to a position that minimizes the reluctance of the magnetic circuit (and maximizes the inductance of the stator windings). The reluctance of the rotor is minimized when a pair of diametrically-opposed rotor poles are aligned with a pair of energized and diametrically-opposed stator poles. In synchronous reluctance electric machines, the windings are energized at a controlled frequency. In switched reluctance electric machines, the angular position of the rotor is detected. A drive circuit energizes the stator windings as a function of the sensed rotor position.

There are two distinct approaches for detecting the angular position of the rotor. In a "sensed" approach, an external physical sensor senses the angular position of the rotor. For example, a rotor position transducer (RPT) with a hall effect sensor or an optical sensor physically senses the angular position of the rotor. In a "sensorless" approach, electronics that are associated with the drive circuit derive the angular rotor position without an external physical sensor. For example in the sensorless approach, rotor position is derived by measuring the back electromotive force (EMF) in an unenergized winding, by introducing diagnostic pulses into the energized and/or the unenergized windings and sensing the resulting electrical response, or by sensing other electrical parameters and deriving rotor angular position.

Conventional switched reluctance electric machines generally include a stator with a solid stator core and/or a laminated stator with a plurality of circular stator plates that are punched from a magnetically conducting material and that are stacked together. The stator plates define salient stator poles that project radially inward and inter-polar slots that are located between the adjacent stator poles. Winding wire is wound around the stator poles. As can be appreciated, increasing the number of winding turns and the slot fill increases the torque density of the electric machine. The stator poles of switched reluctance electric machines typically have parallel sides that do not inherently hold the winding wire in position. Tangs on radially inner ends of the stator poles have been provided to help maintain the winding wire on the stator poles with some limited success.

There are several conventional methods for placing the winding wire on the stator of a switched reluctance electric machine. The winding wire can be initially wound and transferred onto the stator poles. Alternately, needle winding can be used to wind the wire around the stator poles. Both methods tend to leave excess winding wire or loops around axial ends of the stator poles. While winding a large number of turns around the stator poles is good for machine performance, it is difficult to hold the winding wire in place during wrapping and forming of the windings. In addition, the position of winding wire on the stator poles varies from one stator pole to the next and from one electric machine to the next. In other words, the individual winding turns are positioned differently and the cross sectional pattern of the stator pole windings are different. As a result, the inductance and resistance of the stator poles and of the electric machines often vary from one stator pole to the next even though the same number of winding turns are used. Axially inserted wedges or top sticks have also been used between the stator poles to help position the windings with moderate success.

As previously mentioned above, drive circuits of the switched reluctance electric machines need the angular position of the rotor as an input. There are many problems that are associated with switched reluctance electric machines that employ the sensed approach. In the sensed approach, the RPT detects the angular position of the rotor with respect to the stator. The RPT typically includes a sensor board with one or more sensors and a shutter that is coupled to and rotates with the shaft of the rotor. The shutter includes a plurality of shutter teeth that pass through optical sensors as the rotor rotates.

Because the angular rotor position is critical to proper operation of a switched reluctance electric machine, sophisticated alignment techniques are used to ensure that the sensor board of the RPT is properly positioned with respect to the housing and the stator. Misalignment of the sensor board is known to degrade the performance of the electric machine. Unfortunately, utilization of these complex alignment techniques increases the manufacturing costs for switched reluctance electric machines equipped with RPTs.

The RPTs also increase the overall size of the switched reluctance electric machine, which can adversely impact machine and product packaging requirements. The costs of the RPTs often place switched reluctance electric machines at a competitive disadvantage in applications that are suitable for open-loop induction electric machines that do not require RPTs.

Another drawback with RPTs involves field servicing of the switched reluctance electric machines. Specifically, wear elements, such as the bearings, located within the enclosed rotor housing may need to be repaired or replaced. To reach the wear elements, an end shield must be removed from the housing. Because alignment of the sensor board is critical, replacement of the end shield often requires the use of complex realignment techniques. When the alignment techniques are improperly performed by the service technician, the sensor board is misaligned and the motor's performance is adversely impacted.

In an effort to eliminate the RPTs and to reduce manufacturing costs and misalignment problems, it would be desirable to employ the sensorless techniques for sensing rotor position. Switched reluctance electric machines that employ the sensorless approach also have several problems. The sensorless approach detects the magnitude of the back-electromotive force (EMF) of an unenergized winding of the stator in the switched reluctance electric machine or employs diagnostic pulses that are output to energized and/or unenergized windings. The windings are commutated when the sensed EMF magnitude reaches a predetermined level. If diagnostic pulses are used, the windings are commutated when the proper electrical response is sensed. Several patents disclosing sensorless techniques for sensing rotor position in switched reluctance electric machines include U.S. Pat. No. 5,929,590 to Tang and U.S. Pat. No. 5,877,568 to Maes, et al. which are hereby incorporated by reference.

Despite the apparent advantages that are associated with the elimination of RPTs, the sensorless approach has achieved limited success due to the variable electrical characteristics of the stator windings. For example, one source of the variable electrical characteristics is caused by inconsistent placement of the individual winding turns on the stator poles during assembly. When the positions of the individual winding turns relative to the stator pole vary from one stator pole to the next, the electrical characteristics of the stator poles will likewise vary. During use, the windings may also tend to creep or move if they are not held in place. The variable electrical characteristics of the stator windings make it difficult to consistently identify rotor angular position from the relatively low back-EMFs. Likewise the electrical response of the stator windings to the diagnostic pulses is also adversely and inconsistently impacted by variable electrical characteristics.

While the design of switched reluctance electric machines is relatively mature, there are several areas requiring improvement. Specifically, it is desirable to improve the consistency of the electrical characteristics of the stator poles of switched reluctance electric machines. It is desirable to improve the torque density of switched reluctance electric machines through increased slot fill. By increasing the torque density, the size of the switched reluctance electric machine can be reduced for a given torque output or the size can be maintained with an increase in torque output. Electrical machines achieving higher torque density will allow designers of products equipped with switched reluctance electrical machines greater flexibility in product design that may lead to increased sales through product differentiation and/or improved profit margins.

It is also desirable to eliminate the need for RPTs in switched reluctance electric machines. It is also desirable to assemble the windings of the stator of a switched reluctance electric machine in a highly uniform and repeatable manner to improve the performance of sensorless switched reluctance electric machines by reducing variations in the inductance and resistance of the stator.

SUMMARY OF THE INVENTION

A winding end cap assembly according to the invention for an electric machine with a stator and stator poles includes first and second end caps that are connected to opposite axial end surfaces of one of the stator poles. A first inner winding retainer section extends axially to connect an inner end of the first end cap to an inner end of the second end cap.

In other features of the invention, a second inner winding retainer section extends axially to connect the inner end of the first end cap to the inner end of the second end cap. The first and second end caps and the first and second inner winding retainer sections define an annular channel for receiving and retaining winding wire that is wound around the first and second end caps, the stator pole and the first and second inner winding retainer sections. The winding end cap assembly further includes first and second outer retainer sections that connect either hub sections or outer sections of said first and second end caps together.

In another aspect of the invention, a switched reluctance electric machine includes a stator. The stator includes a plurality of stator segments assemblies each with a stator segment core. An end cap assembly includes first and second end caps that are positioned adjacent to opposite axial end surfaces of the stator segment core. A first inner winding retainer section extends axially to connect an inner end of the first end cap to an inner end of the second end cap.

In still another aspect of the invention, a stator segment assembly for a stator of a switched reluctance electric machine includes a stator segment core. The stator segment core includes a radially outer rim section and a tooth section that extends radially inwardly from a center portion of the radially outer rim section. An end cap assembly defines a continuous annular channel. The end cap assembly includes first and second end caps that are positioned adjacent to opposite axial end surfaces of the stator segment core. First and second inner winding retainer sections extend axially to connect inner ends of the first and second end caps together. The first and second inner winding retainer sections engage inner ends of the tooth section.

Still other aspects, objects, features and advantages will be apparent from the specification, the drawings and the claims that follow.

BRIEF DESCRIPTION OF THE DRAWINGS

FIG. 6A shows the stator segment assembly with its wire windings and insulation removed to better illustrate a stack of stator plates and the end cap assembly;

FIG. 6B is a plan view of the end cap assembly shown in FIG. 6A;

FIG. 6C is an end view of the end cap assembly shown in FIG. 6B;

FIG. 7A is similar to FIG. 6A except that an alternate end cap assembly is shown;

FIG. 7B shows a plan view of the alternate end cap assembly of FIG. 7A; and

FIG. 7C illustrates an end view of the alternate end cap assembly shown in FIG. 7B.

DETAILED DESCRIPTION OF THE PREFERRED EMBODIMENTS

Figure 1:
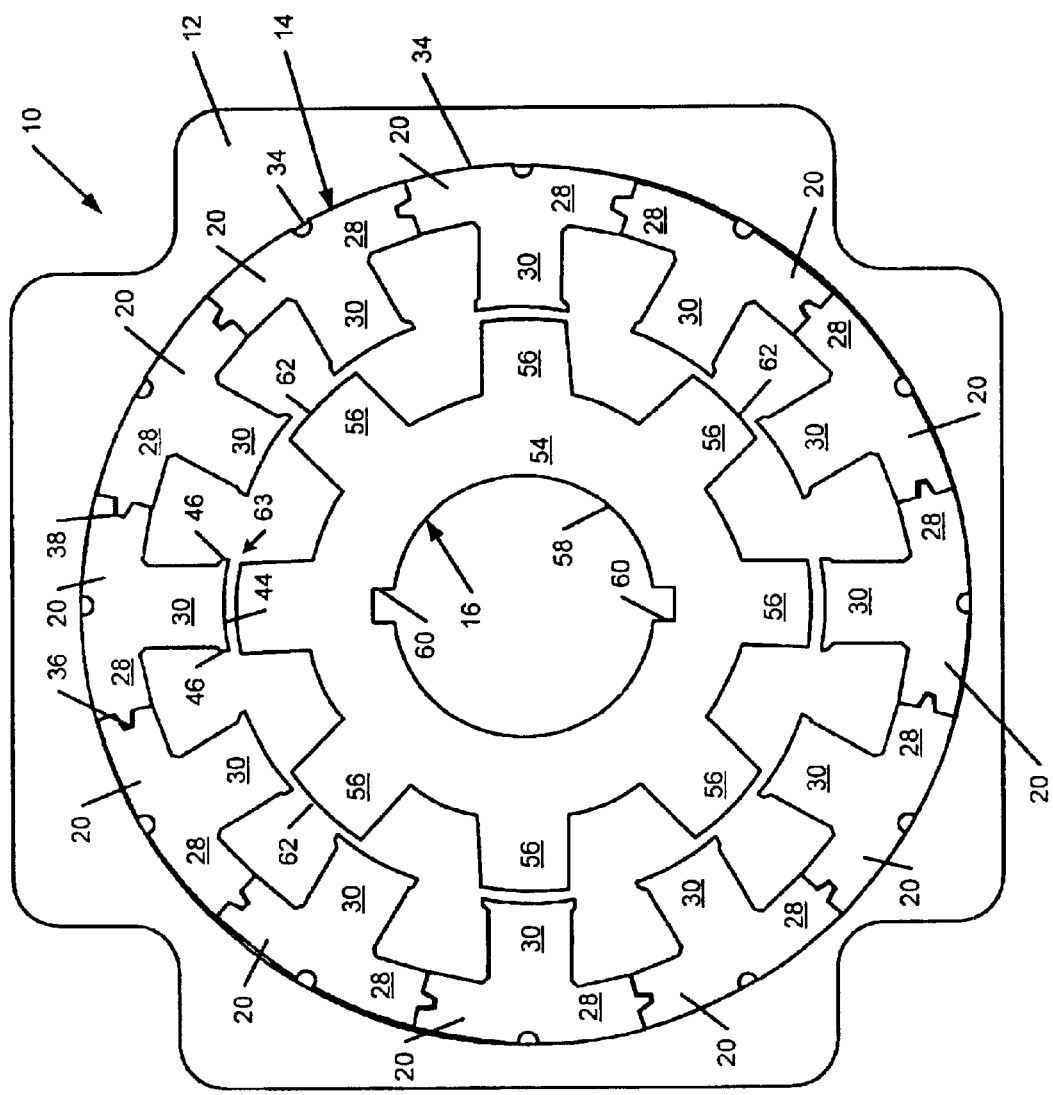
FIG. 1 illustrates a segmented stator and rotor for a switched reluctance electric machine.

The following detailed description provides preferred exemplary embodiments only and is not intended to limit the scope, applicability or configuration of the present invention. Rather, the detailed description of the preferred exemplary embodiments will provide those skilled in the art with an enabling description for implementing the preferred exemplary embodiments of the present invention. It will be understood that various changes may be made in the function and arrangement of the elements without departing from the spirit and scope of the invention as set forth in the appended claims.

The present invention dramatically improves the consistency of electrical characteristics of the stators of a switched reluctance electric machine by segmenting the stator into a plurality of stator segment assemblies and by providing winding end cap assemblies that position and retain winding wire. Each stator segment assembly includes a stator core, the winding end cap assembly, the winding wire and insulation. The stator segment assemblies can be wound individually using computer numerical control (CNC) winding machines that have a high degree of precision when placing each turn of the winding wire. The winding end cap assembly provides a continuous annular channel for receiving the winding wire. The continuous annular channel helps to consistently position the winding wire and to prevent winding creep.

Referring now to the drawings, a switched reluctance electric machine 10 is shown to include a housing 12, a segmented stator 14 mounted in the housing 12, and a rotor 16 supported for rotation relative to the segmented stator 14. While the end cap assembly has particular advantages when used with switched reluctance electric machines, other types of electric machines can be employed. In accordance with the present invention, the segmented stator 14 includes a plurality of stator segment assemblies 18 that can be individually assembled and subsequently combined with other stator segment assemblies to define the segmented stator 14. As will be detailed, each stator segment assembly 18 includes a stator segment core 20, an end cap assembly 22 positioned adjacent and/or attached to the stator segment core 20, and winding wire 24 that is wound around the stator segment core 20 and the end cap assembly 22.

Figure 2:
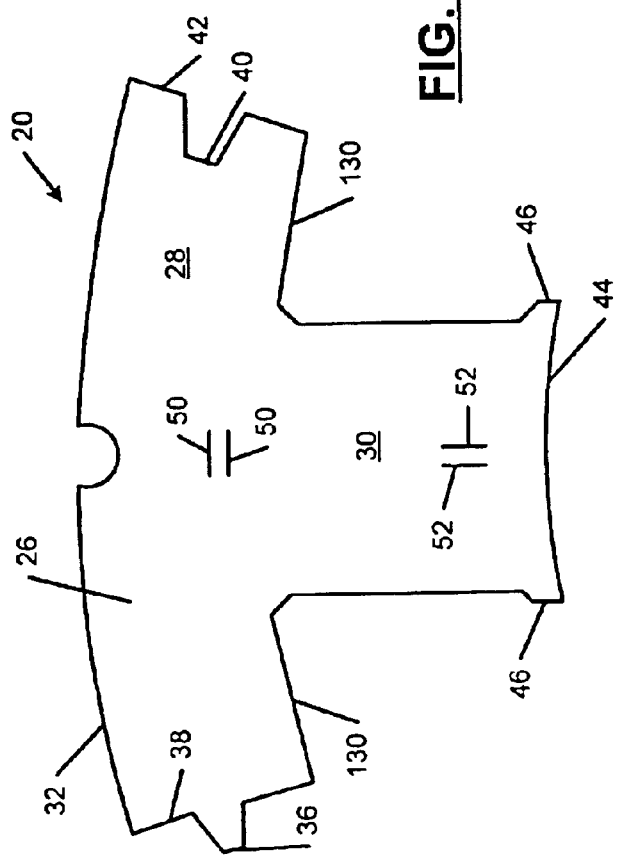
FIG. 2 illustrates a stator plate.

Referring primarily to FIGS. 1 and 2, the stator segment core 20 includes a solid core or a stack of individual stator plates 26. Each of the stator plates 26 include an arcuate outer rim section 28 and a tooth-shaped pole section 30. An outer edge surface 32 of the outer rim section 28 is shaped for mating with an inner wall surface 34 of the housing 12. An inner edge surface 130 of the outer rim section 28 is usually arcuate, and is generally concentric with the outer edge surface 32. Each outer rim section 28 has a tongue projection 36 formed on one edge surface 38 and a groove 40 on its opposite edge surface 42. Each pole section 30 of the stator plates 26 has an arcuate inner edge surface 44 and a pair of circumferentially-extending projections 46.

As previously mentioned, the stator segment core 20 is preferably defined by a plurality of stator plates 26 that are stacked together. The stator plates 26 are die cut from thin sheets of magnetically conductive material. During the die cutting operation, a first pair of slits 50 are cut into the outer rim section 28 and a second pair of slits 52 are cut into the pole section 30 and central portions between the slits 50 and 52 are deformed. The slits 50 are transverse in alignment relative to the slits 52. The stator plates 26 that form the stator segment core 20 are stacked and press fit together. This operation results in the stator plates 26 being releasably interconnected to define the stator segment core 20.

The rotor 16 is shown to include a circular rim section 54 and a plurality of tooth-shaped pole sections 56 that project radially from the rim section 54. A circular bore 58 is formed in the rotor 16 and includes keyways 60. A rotor shaft (not shown) is received by the circular bore 58 of the rotor 16. In the particular embodiment shown, the rotor 16 has eight equally-spaced rotor pole sections 56 and the segmented stator 14 has twelve equally-spaced pole sections 30. Other rotor pole and stator pole combinations are also contemplated. In addition, each rotor pole section 56 has an arcuate outer edge surface 62 that defines an air gap 63 with respect to the arcuate inner edge surface 44 on the pole sections 30 of the stator plates 26.

Figure 3:
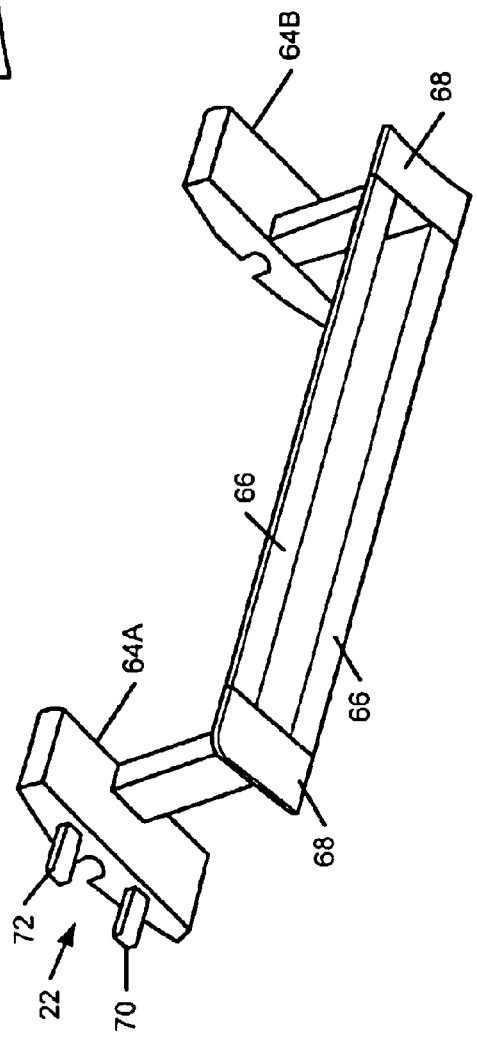
FIG. 3 is a perspective view of an end cap assembly according to the present invention.
Figure 4:
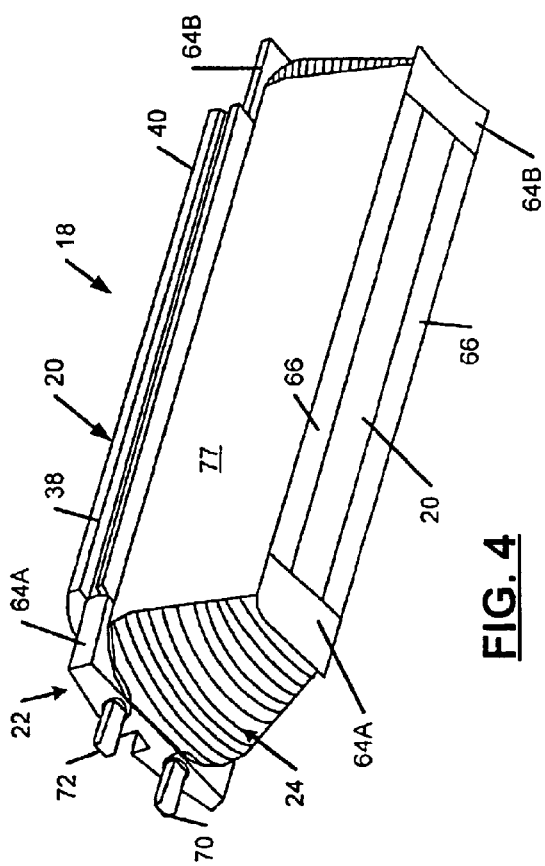
FIG. 4 is a perspective view of a stator segment assembly associated with the stator.

Referring to FIGS. 3 and 4, the stator segment assembly 18 is shown to include the stator segment core 20, the end cap assembly 22 and the winding wire 24. The end cap assembly 22 is made from magnetically non-conductive material and includes a first end cap 64A, a second end cap 64B and a pair of elongated winding retainer sections 66. The first end cap 64A is located at one end of the stator segment core 20 and the second end cap 64B is located at the opposite end of the stator segment core 20. The winding retainer sections 66 interconnect the first and second end caps 64A and 64B and are located adjacent to the projections 46 near the radially inner end of the pole sections 30 of the stator plates 26. Preferably, the end caps 64A and 64B are similar in configuration. Likewise, it is preferable that the retainer sections 66 are similar in configuration. Snap-in connections are contemplated for connecting the opposite ends of each retainer section 66 to the end caps 64A and 64B. Additionally, it is contemplated that adhesives are used for bonding the end caps 64A and 64B to the opposite ends of the stator segment core 20. The end caps 64A and 64B and/or the retainer sections 66 can also be molded around or adhered to the stator segment core 20 as an integral end cap assembly 22 or as individual pieces. Since the first end cap 64A is similar to the second end cap 64B, the following description of the components will use reference numerals with an "A" suffix for the first end cap 64A and the reference numerals for similar components of the second end cap 64B will be identical with a "B" suffix.

Unlike brushless permanent magnet electric machines, switched reluctance electric machines do not include permanent magnets or other DC excitation on the outer surface of the rotor. Switched reluctance motors establish a flux path through the rotor by energizing diametrically-opposed salient stator poles. Force is exerted on the diametrically-opposed rotor poles to minimize the reluctance of the magnetic circuit and to align the rotor poles with the energized salient stator poles. Because of these operational differences, switched reluctance machines tend to have more space between adjacent stator poles while brushless permanent magnet machines typically have salient poles that are positioned as close together as possible. The close proximity of the salient stator poles of brushless permanent magnet machines reduces the reluctance between the adjacent stator poles. In contrast, the spacing of the salient stator poles in switched reluctance machines increases the reluctance between adjacent salient stator poles. Magnetically conducting tangs on the salient stator poles cannot be increased sufficiently on switched reluctance machines to retain the windings without also reducing the reluctance between the adjacent stator poles. The end cap assembly according to the present invention, however, retains the windings without reducing the inter-polar reluctance by employing insulating retainer sections 66. The insulating winding retainer sections extend much further than would otherwise be possible using tangs in brushless permanent magnet machines. As a result, the insulating retainer sections provide axial retention of the windings.

Terminals 70 and 72 are shown in FIGS. 4 and 6A to be mounted in slots 74 and 76 (FIG. 6C), respectively, formed in an end surface 78A of the first end cap 64A. One end of the winding wire 24 is connected to the first terminal 70 while an opposite end of the winding wire 24 is connected to the second terminal 72. Insulating material 77 is shown to be positioned to cover winding wire 24 on both lateral sides of stator core 20. The insulating material 77 is also positioned (but not shown) between the sides of the pole section 30 of the stator segment core 20 and the winding wire 24.

Figure 5:
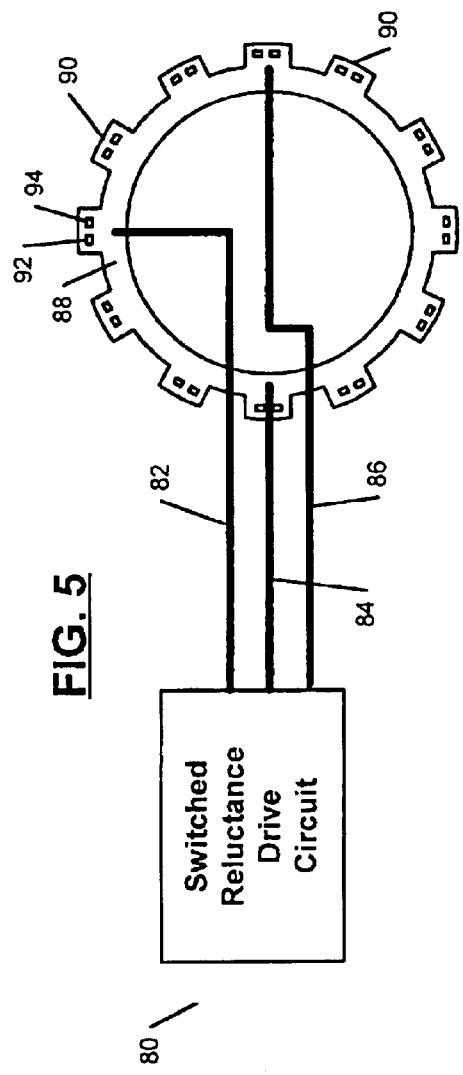
FIG. 5 illustrates a switched reluctance drive circuit and a circuit board for connecting the drive circuit to terminals of the stator segment assemblies.

Referring to FIG. 5, a switched reluctance drive circuit 80 is shown connected via connecting wires 82, 84 and 86 to a printed circuit board 88. The printed circuit board 88 is circular and has a plurality of radially outwardly projecting terminal pads 90. Each terminal pad 90 has conductive terminal slots 92 and 94 arranged to accept installation of the terminals 70 and 72 for each stator segment assembly 18. The drive circuit 80 operates to control energization of the winding wire 24 of the stator segment assemblies 18.

To more clearly illustrate the structure of the end cap assembly 22, FIG. 6A shows the stator segment assembly 18 prior to the insulation 77 being placed in the slots and the winding wire 24 being wound thereon. The first end cap 64A includes an outer section 98A and an inner section 100A interconnected by a hub section 102A, all defining a common face surface 104A. The face surface 104A abuts and is bonded to an axial end surface 106 of the stator segment core 20. Similarly, the face surface 104B of second end cap 64B abuts and is bonded to an end surface 108 of the stator segment core 20. When the first end cap 64A is secured to the stator segment core 20, its outer section 98A extends slightly radially inward with respect to the outer rim section 28 and is parallel to the outer rim section 28. The hub section 102A is aligned with pole section 30 and the inner section 100A is aligned with and extends laterally at the inner edge surface 44 beyond the projections 46. A similar alignment is provided when the second end cap 64B is secured to the opposite end surface 108 of the stator segment core 20. Moreover, the width of hub sections 102A and 102B is less than or equal to the width of the pole sections 30 of the stator segment core 20. The opposite ends of the retainer sections 66 are connected to the face surfaces 104A and 104B of the end caps 64A and 64B, respectively, adjacent to their inner sections 100A and 100B. As such, the end cap assembly 22 defines a continuous annular channel 109 within which the winding wire 24 can be precisely installed and maintained.

FIG. 6B shows the inner section 100A of the first end cap 64A and the inner section 100B of the second end cap 64B to be rectangular in shape. It is contemplated, however, that other configurations (i.e. semi-circular, square, tapered, etc.) could be used. As a further option, the retainer sections 66 could be provided as a cantilevered section that is integrally formed with the end caps 64A and/or 64B and adapted for connection to the inner section of the opposite end cap. To reduce the weight of the end cap assembly 22, lateral axial grooves 110 and a central axial groove 112 can be formed on the outer section of the end caps 64A and 64B. Likewise, a cavity 114 can also be formed to provide uniform wall thickness, to avoid plastic "sinking" and deformation, and to reduce material and weight.

Referring now to FIGS. 7A, 7B and 7C, an alternative cap assembly 122 is shown for connection to the stator segment core 20 and supporting the winding wire 24. Reference numerals from FIGS. 6A, 6B and 6C will be used where appropriate to identify similar elements. Specifically, the first end cap 124A is generally similar to the first end cap 64A. The alternative end cap assembly 122 includes an additional pair of retainer sections. An outer retainer section 126A extends axially from the common face surface 104A adjacent to the outer section 98A for connection to the outer section 98B of the second end cap 124B. An outer retainer section 126B likewise extends axially from its common face surface 104B for connection to common face surface 104A of first end cap 124A. The outer retainer sections 126A and 126B provide additional support for precisely winding the winding wire 24. The outer retainer sections 126A and 126B have an arcuate upper edge 127A and 127B to mate with the profile of inner wall surfaces 130 (FIG. 2) of the outer rim section 28. Additionally, the outer retainer sections 126A and 126B have a lower edge 132A and 132B that is constructed perpendicular to the hub sections 102A and 102B.

As can be appreciated from the foregoing, the segmented stator for the switched reluctance electric machine according to the invention improves the torque density of the electric machine by allowing the stator segment assemblies to be precisely wound. As a result of increased slot fill, the torque output for the electric machine can be increased. Alternately, the outer dimensions of the electric machine can be reduced for a given torque output. The stator segment assemblies of the switched reluctance electric machine can be individually wound. The continuous annular channel that is provided by the winding end cap assembly helps to consistently place winding turns and to prevent winding creep. The stator and its stator poles can be produced with a greater electrical uniformity and with lower variations in inductance and resistance. As a result of the improved electrical tolerances, the sensorless approach can successfully be employed, which dramatically lowers the manufacturing costs of the switched reluctance electric machine and improves reliability in the field. Because the electrical tolerances of the stator segments have been improved, less costly drive circuits can be employed and/or more accurate control can be achieved.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. In an electric machine with a circumferentially segmented stator, a winding end cap assembly for a stator segment assembly including a stator core that includes a plurality of stator plates that are stacked in an axial direction and that define a stator pole, comprising:

first and second end caps that are connected to said stator plates of said stator core that are located at opposite axial end surfaces of said stator core;

a first inner winding retainer section that extends axially to connect an inner end of said first end cap to an inner end of said second end can; and winding wire that is wound around said stator core and said end cap assembly, wherein said winding end cap assembly is not located between said winding wire and radial side surfaces of said stator core.

2. The winding end cap assembly of claim 1 further comprising:

a second inner winding retainer section that extends axially to connect said inner end of said first end cap to said inner end of said second end cap.

3. The winding end cap assembly of claim 2 wherein said first and second end caps and said first and second inner winding retainer sections are molded integrally.

4. The winding end cap assembly of claim 2 wherein said first and second end caps include an outer section, an inner section and a hub section that connects said outer section to said inner section.

5. A The winding end cap assembly of claim 4 wherein said winding end cap assembly is made of a magnetically insulating material and said electric machine is a switched reluctance electric machine.

6. The winding end cap assembly of claim 5 wherein said stator segment assemblies comprise a stator segment core including a stack of stator plates that have a radially outer rim section and a tooth section that extends radially inwardly from a center portion of said radially outer rim section.

7. The winding end cap assembly of claim 6 wherein said outer sections of said first and second end caps align with said outer rim section of said stator plates, said inner sections of said first and second end caps align with radially inner ends of said tooth section of said stator plates, and said hub sections of said first and second end caps align with said tooth section of said stator plates.

8. The winding end cap assembly of claim 6 wherein said first and second inner winding retainer sections extend axially along circumferential projections on a radially inner end of said tooth section of said stator segment core.

9. The winding end cap assembly of claim 4 wherein said outer section of said first end cap receives first and second terminals for connecting to opposite ends of winding wire.

10. The winding end cap assembly of claim 4 wherein said first and second end caps and said first and second inner winding retainer sections define a continuous annular channel that receives winding wire.

11. The winding end cap assembly of claim 4 further comprising:
   first and second outer retainer sections that connect said first and second end caps adjacent to said outer sections of said first and second end caps.

12. The winding end cap assembly of claim 4 wherein said outer section includes a cavity.

13. The winding end cap assembly of claim 4 wherein said outer section includes a groove on a radially outer surface thereof.

14. A switched reluctance electric machine comprising:
   a segmented stator including a plurality of stator segment assemblies each with a stator segment core that includes a plurality of stator plates that are stacked in an axial direction;
   an end cap assembly that includes first and second end caps that are arranged adjacent to said stator plates that are located at opposite axial end surfaces of said stator segment core and a first inner winding retainer section that extends axially to connect an inner end of said first end cap to an inner end of said second end cap; and
   winding wire that is wound around said stator core and said end cap assembly, wherein said end cap assembly is not located between said winding wire and radial side surfaces of said stator segment core.

15. The switched reluctance electric machine of claim 14 wherein said first and second end caps include an outer section, an inner section and a hub section that connects said outer section to said inner section.

16. The switched reluctance electric machine of claim 15 further comprising:
   first and second outer retainer sections that connect said first and second end caps adjacent to said outer sections of said first and second end caps.

17. The switched reluctance electric machine of claim 15 wherein said outer section of said first end cap receives first and second terminals that are connected to opposite ends of said winding wire.

18. The switched reluctance electric machine of claim 14 further comprising insulation that is located between said winding wire and said stator segment core.

19. A stator segment assembly for a stator of a switched reluctance electric machine comprising:
   a stator segment core for a segmented stator that includes a plurality of stator plates that are stacked in an axial direction and that define a radially outer rim section and a tooth section that extends radially inwardly from a center portion of said radially outer rim section;
   an end cap assembly that defines a continuous annular channel and that includes first and second end caps that are positioned adjacent to said stator plates that are located at opposite axial end surfaces of said stator segment core and first and second inner winding retainer sections that extend axially to connect inner ends of said first and second end caps together, wherein said first and second inner winding retainer sections engage inner ends of said tooth section; and
   winding wire that is wound around said stator segment core and said first and second end caps, wherein said end cap assembly is not located between said winding wire and radial side surfaces of said stator segment core.

20. The stator segment assembly of claim 19 wherein said first and second end caps include an outer section, an inner section and a hub section that connects said outer section to said inner section.

21. The stator segment assembly of claim 20 further comprising:
   first and second outer retainer sections that connect said first and second end caps adjacent to said outer sections of said first and second end caps.

22. The stator segment assembly of claim 19 wherein said outer section of said first end cap receives first and second terminals for connecting opposite ends of winding wire.

23. The stator segment assembly of claim 19 further comprising insulation that is located between said winding wire and said stator segment core.

24. A stator for a switched reluctance electric machine comprising:
   a plurality of stator segment assemblies each including a stator segment core that includes a plurality of stator plates that are stacked in an axial direction, a winding end cap assembly including first and second end caps positioned adjacent to said stator plates that are located at opposite axial end surfaces of said stator segment core, and windings wound around said first and second end caps and said stator segment core, wherein said end cap assembly is not located between said windings and radial side surfaces of said stator segment core.

25. The stator of claim 24 wherein said first and second end caps include an outer section, an inner section and a hub section that connects said outer section to said inner section.

26. The stator of claim 25 wherein said winding end cap assembly includes first and second inner retainer sections that connect said inner sections of said first and second end caps together.

27. The stator of claim 26 wherein said winding end cap assembly includes first and second outer retainer sections that connect one of said outer sections and said hub sections of said first and second end caps together.

28. A stator segment assembly for a circumferentially segmented stator of an electric machine, comprising:
   a stator segment core that includes a plurality of stator plates that are stacked in an axial direction and that define a stator pole of said stator segment assembly that includes first and second side surfaces that extend axially;
   an end cap assembly including a first winding retainer section that extends continuously along said first axial side surface, a second winding retainer section that extends continuously along said second axial side surface, and a third winding retainer section that extends continuously along said first axial side surface in a position that is radially outside of said first winding retainer section, a fourth winding retainer section that extends continuously along said second axial side surface in a position that is radially outside of said second winding retainer section, a first end cap that is connected to one end surface of said stator segment core and that is connected to one end of said first winding retainer section, and a second end cap that is connected to an opposite end surface of said stator segment core and that is connected to an opposite end of said first winding retainer section; and winding wire that is wound around said stator segment core and said first and second end caps and that is retained by said first winding retainer section, wherein said end cap assembly is not located between said winding wire and radial side surfaces of said stator segment core.

* * * * *